United States Patent [19]

Li

[11] Patent Number: 5,763,980

[45] Date of Patent: Jun. 9, 1998

[54] BICYCLE DRIVING MOTOR STRUCTURE

[76] Inventor: Tsan Kuang Li, Fl. 5, No. 21, Ln. 16, Sec 2, Chung San N. Rd.., Taipei, Taiwan

[21] Appl. No.: 767,875

[22] Filed: Dec. 17, 1996

[51] Int. Cl.⁶ ........................................ H01L 41/08
[52] U.S. Cl. ............................................... 310/323
[58] Field of Search ................... 310/323, 328

[56] References Cited

U.S. PATENT DOCUMENTS

| 4,926,084 | 5/1990 | Furutsu et al. | 310/323 X |
| 4,935,659 | 6/1990 | Naka et al. | 310/323 X |
| 4,952,834 | 8/1990 | Okada | 310/323 X |
| 4,980,597 | 12/1990 | Iwao | 310/323 X |
| 5,210,651 | 5/1993 | Shibuya et al. | 310/323 X |
| 5,329,201 | 7/1994 | Shirasaki | 310/323 |

*Primary Examiner*—Mark O. Budd
*Attorney, Agent, or Firm*—Morton J. Rosenberg; David I. Klein; Jun Y. Lee

[57] ABSTRACT

An ultrasonic type bicycle driving motor includes an ultrasonic type rotation driving device to replace the silicon steel plates, windings and magnet that are used in the conventional bicycle driving motor. A rotary manual control is provided on the handlebar of the bicycle to allow a rider to control the voltage and current supplied from a battery set to the motor, preferably in a manner similar to the handle throttle control adapted in a motorcycle, so that the rider may regulate the output torque and rotational speed of the motor as desired. The disclosed bicycle driving motor does not change the outside configuration of the bicycle and does not interfere with operation of the bicycle. Further, the disclosed bicycle driving motor is easy to install and suitable for bicycles of almost all designs. Maintenance is simple. The disclosed bicycle driving motor may be either mounted on the front wheel or the rear wheel, or on both the front and rear wheels of the bicycle.

9 Claims, 5 Drawing Sheets

BICYCLE DRIVING MOTOR STRUCTURE

FIELD OF THE INVENTION

The present invention relates generally to a motorized bicycle and in particular to an ultrasonic motor structure for driving a motorized bicycle.

BACKGROUND OF THE INVENTION

Motorized bicycles have been widely available, which provide a clean and noiseless transportation means. The motorized bicycle have become more popular since the development of the motors that have very small or short axial dimension. Such a short motor may be mounted on either the front wheel axle or the rear wheel axle of the bicycle and powered by a compact battery set.

Examples of the motorized bicycles using the short motor include U.S. Pat. No. 5,450,915, entitled "Electric Motor-in-Wheel" (see FIG. 1 of the attached drawings) and U.S. patent application Ser. No. 08/359,749, entitled "Auxiliary Magnetic Motor" (see FIG. 2 of the attached drawings). The conventional designs use a very short motor mounted on the wheel axle to drive the wheel. These conventional designs, however, comprise conventional motor parts, such as windings A, magnet B, silicon steel plates C and the like, as well as control device for controlling the operation of the motor. This results in a great weight. Further, it has a lower efficiency.

In addition, the silicon plates, windings and magnet are expensive parts. Thus a motorized bicycle with such a conventional short motor is costly which in turn results in a poor market competitivity.

It is therefore desirable to provide a bicycle driving motor structure which overcomes such problems.

SUMMARY OF THE INVENTION

It is an object of the present invention to provide an ultrasonic motor structure of a motorized bicycle which is compact is size and light in weight so as to overcome the problems encountered in the prior art designs.

It is another object of the present invention to provide an ultrasonic motor for replacing the conventional driving motor adapted in a motorized bicycle so as to reduce the overall cost of the bicycle.

It is another object of the present invention to provide a motorized bicycle which adapts an ultrasonic motor to drive the bicycle wheel so as to significantly enhance the power transmission efficiency of the motorized bicycle.

In accordance with the present invention, to achieve the above objects, there is provided a motorized bicycle which comprises a disk-shaped piezoelectric member co-axial with and fixed to a vibration member to replace the conventional motor parts of silicon steel plates, windings and magnet which causes ultrasonically induced vibration to output torque through a planetary gear system so as to reduce the overall weight of the bicycle driving motor and increase the torque output.

The features and advantages of the present invention will be readily understood from the following description of a preferred embodiment, reference being had to the attached drawings, wherein:

DETAILED DESCRIPTION OF THE PREFERRED EMBODIMENT

Figure 1:
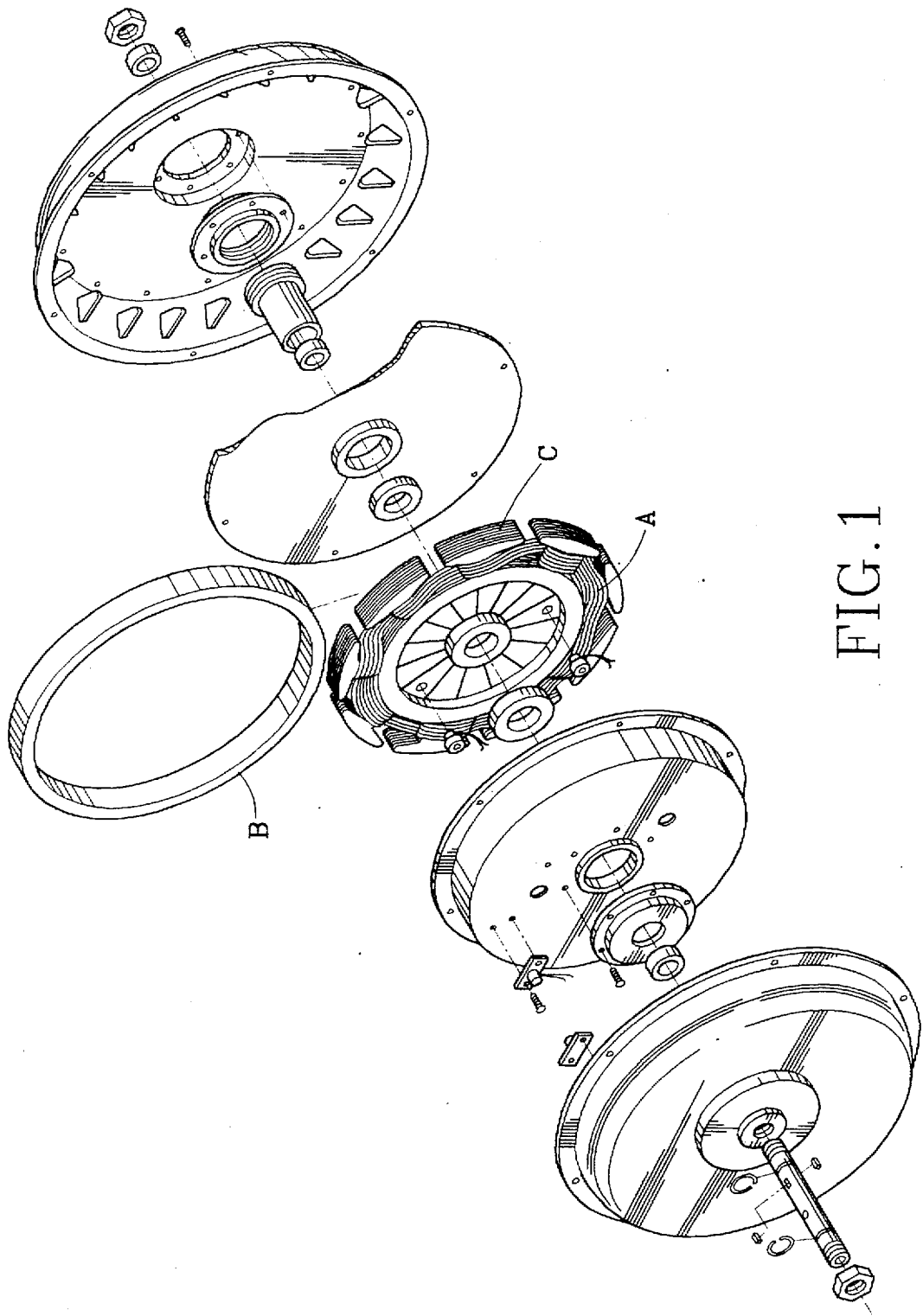
FIG. 1 is an exploded perspective view showing a conventional bicycle driving motor structure.
Figure 2:
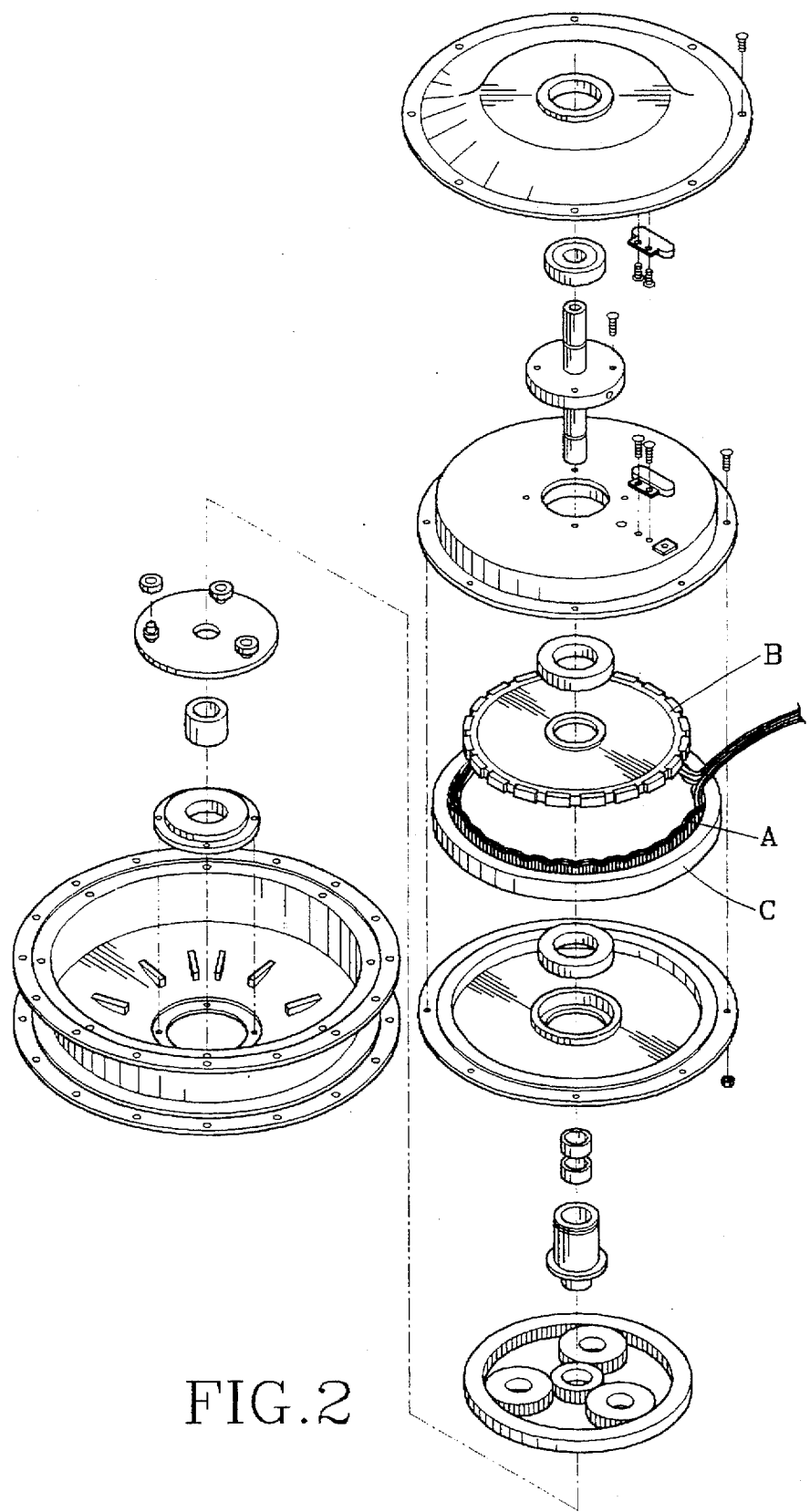
FIG. 2 is an exploded perspective view showing another conventional bicycle driving motor structure.
Figure 3:
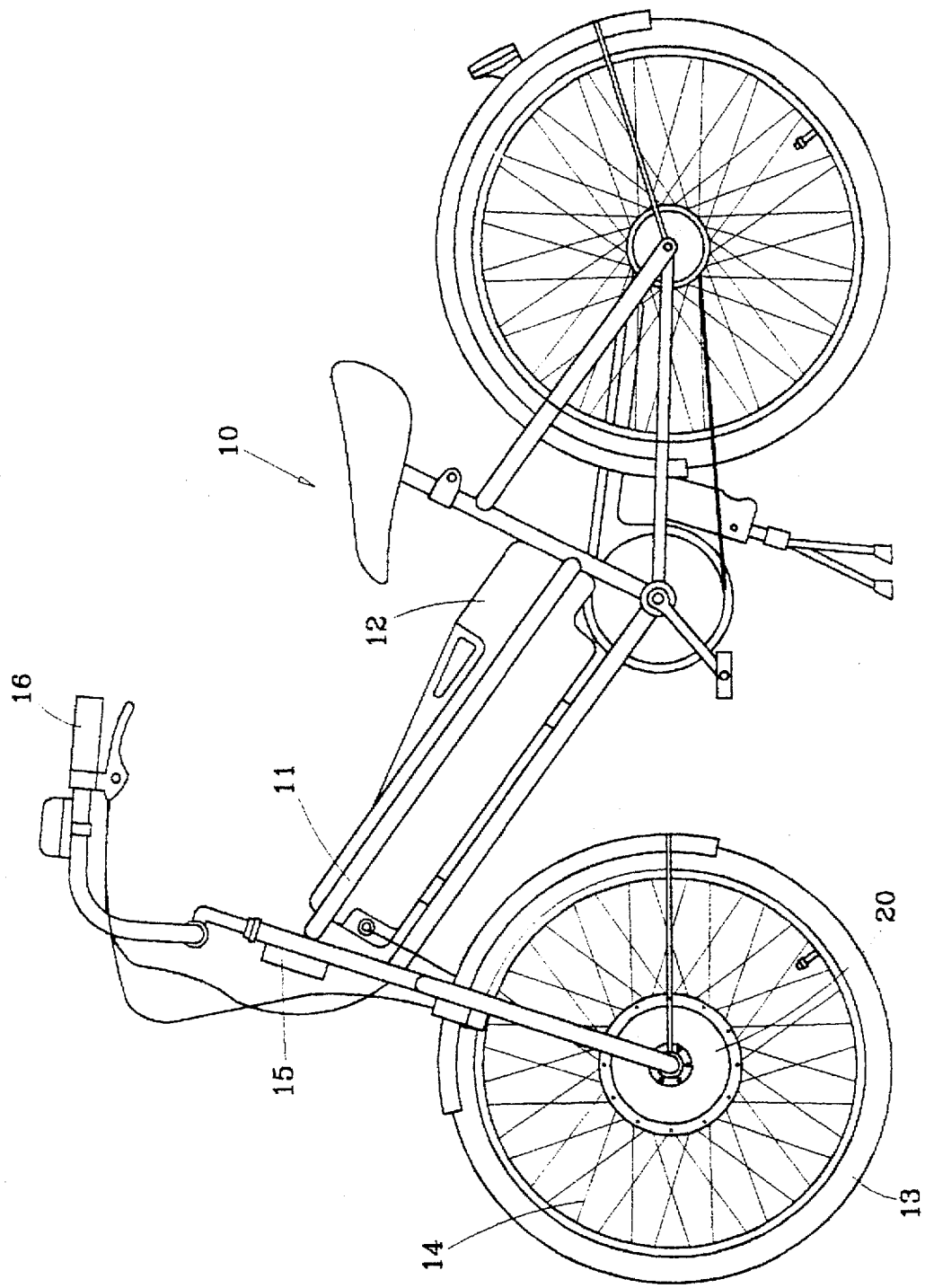
FIG. 3 is a side elevational view showing a motorized bicycle on which an ultrasonic type bicycle driving motor constructed in accordance with the present invention is mounted.

With reference to the drawings and in particular to FIG. 3, wherein a motorized bicycle, generally designated at 10, is shown, the motorized bicycle 10 comprises a bicycle frame 11 having a handlebar 16 and two wheels 13 mounted to the respective wheel axle 21 (see FIGS. 4 and 5) via spokes 14. The motorized bicycle 10 comprises an ultrasonic type driving motor, generally designated at 20, constructed in accordance with the present invention. In the embodiment illustrated, the driving motor 20 is mounted on the front wheel 13 with the spokes 14 connected thereto and extending therefrom to the front wheel rim. A battery set 12 for powering the driving motor 20 and a control device 15 for activating/de-activating the driving motor 20 are mounted on the bicycle frame 11 and electrically connected to the driving motor 20.

Figure 4:
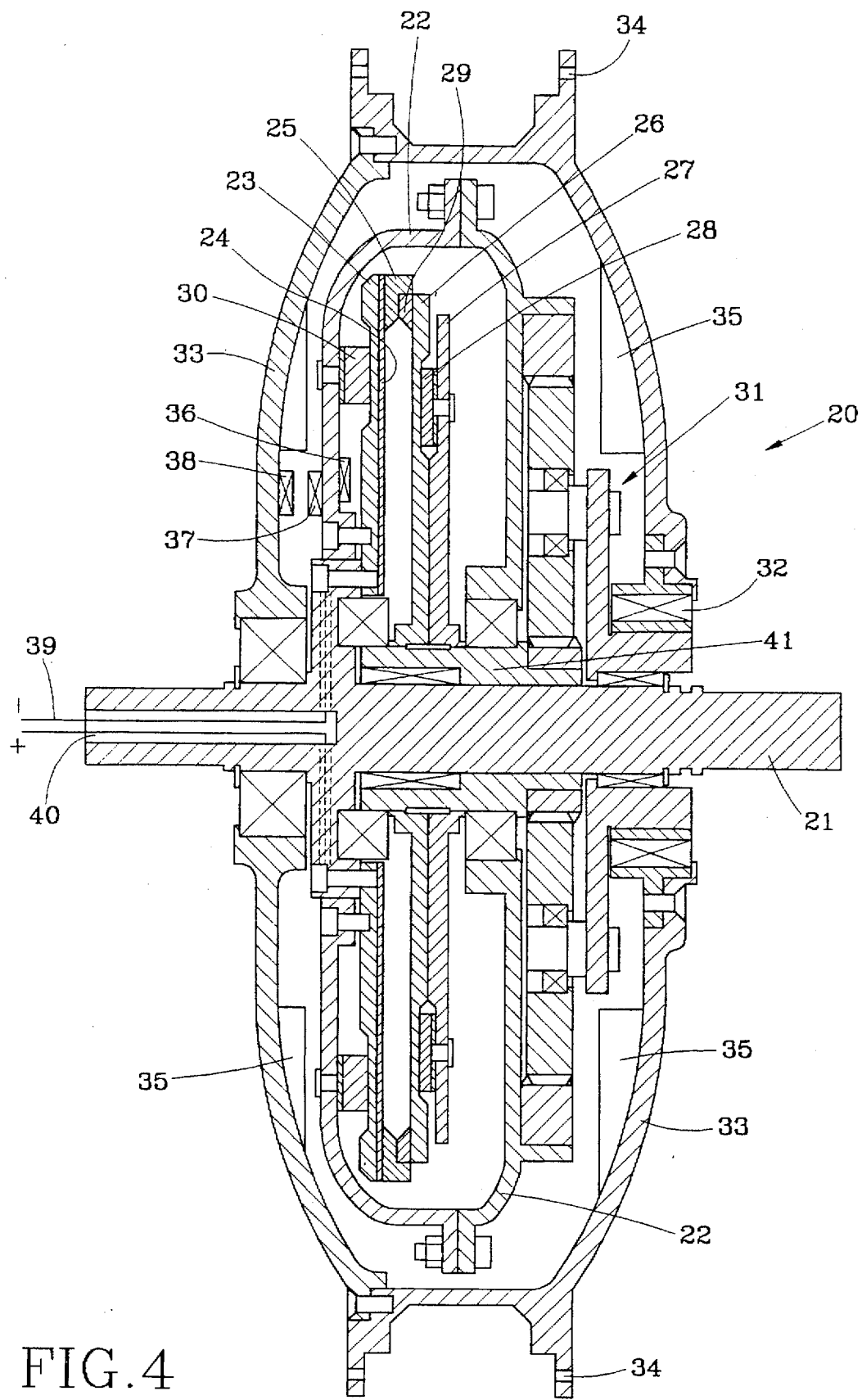
FIG. 4 is a cross-sectional view showing the bicycle driving motor constructed in accordance with the present invention.
Figure 5:
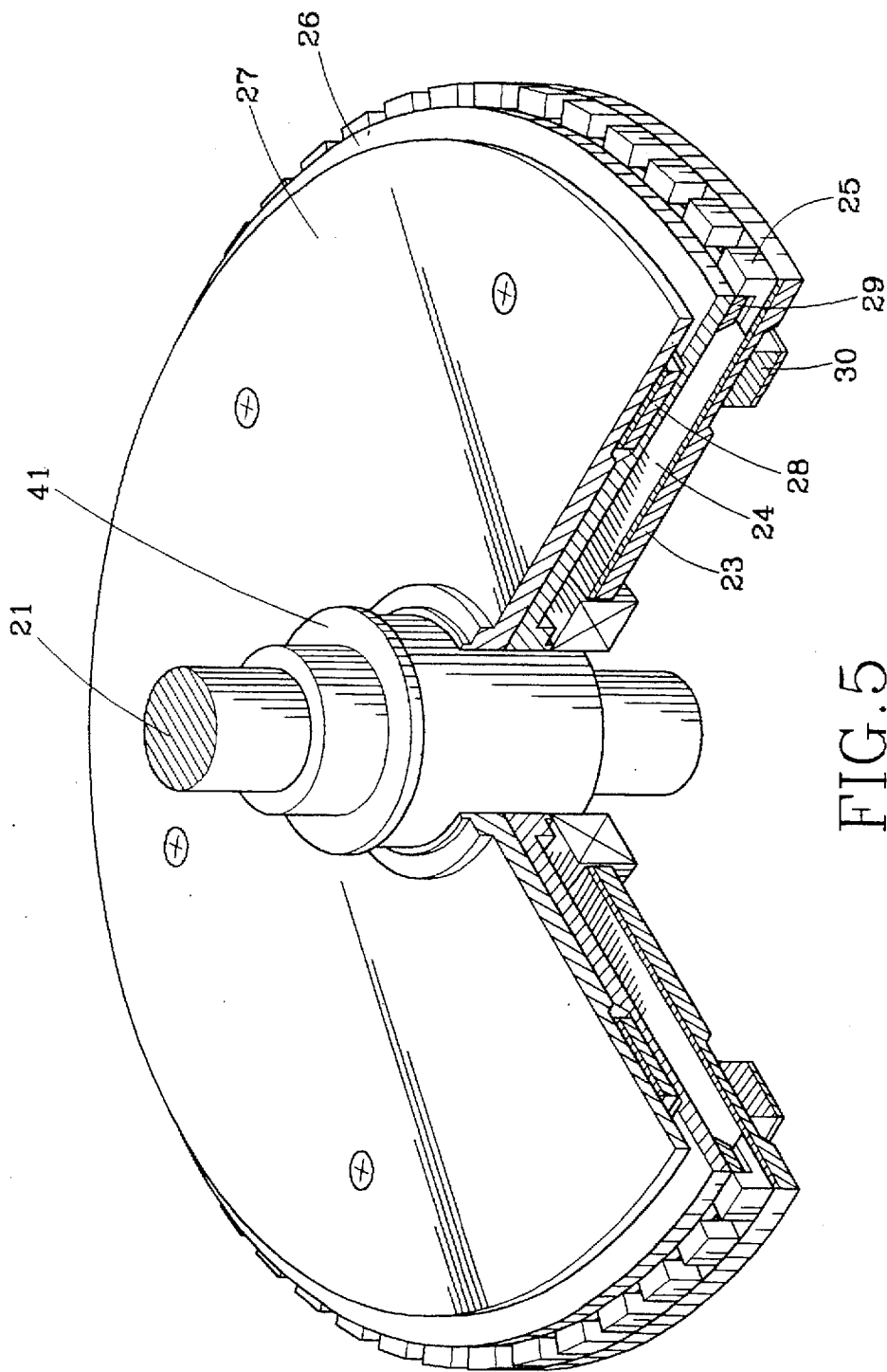
FIG. 5 is a perspective view, partially broken, showing the spatial relationship among the piezoelectric member, the vibration member and the rotation members of the bicycle driving motor of the present invention.

With particular reference to FIGS. 4 and 5, wherein the bicycle driving motor 20 which is constructed in accordance with a preferred embodiment of the present invention is illustrated, the driving motor 20 comprises an outer casing 33 rotatably mounted on the wheel axle 21, having circumferential flanges on which apertures 34 are formed to connect the spokes 14. The spokes 14 extend from the outer casing 33 to the wheel rim so as to secure the outer casing 33 to the wheel rim.

The outer casing 33 defines therein an interior space inside which an inner casing 22 is mounted. The inner casing 22 is fixed on the wheel axle 21 so that the outer casing 33 is rotatable with respect to the inner casing 22.

The inner casing 22 defines therein an interior space inside which vibration means 24 in the form of a flat disk is received and fixed to the inner casing 22. Piezoelectric means 23, also in the form of a flat member, is attached to a first side of the vibration means 24. Moving means, which in the embodiment comprises two rotatable members 26 and 27, in the form of thin flat plates, is also disposed inside the inner casing 22 and co-axial and rotatable with respect to the wheel axle 21.

The piezoelectric means 23 and the vibration means 24 are fixedly secured inside the inner casing 22. The vibration means 24 has a plurality of projections 25, angularly equally spaced from each other and substantially co-axial about the wheel axle 21, are fixed on an opposite second side of the vibration means 24 and located corresponding to rubbing material 29 fixed on a circumferential edge of the rotatable member 26 of the moving means so that when the piezoelectric means 23 is supplied with electrical power from the battery set 12, the vibration means 24 undergoes ultrasonic vibration (very high frequency vibration) caused by the excited piezoelectric means 23 to contact and press the rubbing material 29 of the rotatable member 26, causing the moving means 26 and 27 to continue rotating.

As shown in FIG. 4, the moving means 26 and 27 are mounted on a collar 41 rotatably fit over the wheel axle 21 to be drivingly coupled to a sun gear of a planetary gear system 31 which is co-axially and rotatably mounted on the wheel axle 21. In the embodiment illustrated, the planetary gear system 31 is located outside the inner casing 22, but within the interior space of the outer casing 33. A one way clutch 32 is drivingly connected between the planetary gear system 31 and the outer casing 33 so as to transmit the rotation of the moving means 26 and 27 to the outer casing 33. Thus, when the moving means 26 and 27 are rotating, the rotation of and the torque generated on the moving means 26 and 27 is transmitted via the collar 41, the planetary gear system 31 and the one way clutch 32 to drive the outer casing 33 to rotate about the wheel axle 21 so as to drive the bicycle wheel 13 to move the bicycle 10.

As shown in FIG. 4, adjustable cushion means 28 and 30 are respectively mounted between the rotatable members 26 and 27 of the moving means and between the piezoelectric means 23 and an inside surface of the inner casing 22. The cushion means 28 and 30 are for buffering shock and/or thrust generated in the starting of the motor 20. Further, the cushion means 28 and 30 also serve to protect the projections 25 and the rubbing material 29 from being over-worn and thus forming a gap therebetween.

As shown in FIGS. 3 and 4, an electric cable 39 that has one end connected to the battery set 12 and the control device 15 extends through a central bore 40 formed on the wheel axle 21 and runs into the interior space of the inner casing 22 to electrically connect to the piezoelectric means 23 for supplying electrical power thereto. In accordance with the present invention, preferably a manual control is associated with the handlebar 16 so that by rotating the manual control on the handlebar 16, a rider of the bicycle 10 is capable to adjust the electrical power output of the battery set 12 by means of the control device 15 so as to regulate the torque output of the motor 20 as desired.

When the motor 20 is operating, since the inner casing 22 of the motor 20 is stationary with respect to the wheel axle 21, while the outer casing 33 is rotatable about the wheel axle 21, a relative rotation is present between the inner casing 22 and the outer casing 33. The outer casing 33 may have a plurality of blades 35 fixed on an inside surface thereof so that when the outer casing 33 is rotating, the blades 33 cause an air current for ventilation and heat dissipation purpose. Alternatively, the inner casing 22 may be provided with a temperature sensor 36 located at a suitable position, preferably inside the inner casing 22, to detect the inside temperature of the motor 20 so that when the temperature of the motor 20 raises beyond a predetermined threshold, the electrical power supplied to the motor 20 from the battery set 12 is cut off.

In addition, the motor 20 may incorporate a speed sensor inside the outer casing 33 to detect the rotational speed of the motor 20. The speed sensor may be any known device, such as a reed switch 37 fixed on the inner casing 22 and a mated magnet 38 fixed on the outer casing 33. By counting the frequency that the magnet 38 moves across the reed switch 37, the rotational speed of the motor 20 may be detected.

In view of the above description of the preferred embodiment of the present invention, the windings, silicon steel plates and magnet of the conventional bicycle driving motor are replaced with the piezoelectric means, vibration means and moving means which are in the form of thin flat disks or plates, so that the overall weight of the bicycle driving motor may be minimized and the size may be the most compact. Due to the fact that the ultrasonic vibration type motors have the characteristics of great torque output, low power consumption and simple structure, a light-weighted, small-sized and low cost bicycle driving motor may be achieved.

The above description is made with respect to a preferred embodiment of the present invention and for those skilled in the art, it is possible to make modifications and changes to the above-described embodiment without departing from the scope and spirit of the present invention. All these modifications and changes should be considered within the scope of the present invention as defined in the appended claims.

What is claimed is:

1. A bicycle driving motor comprising a battery set for supplying electrical power and a control device for controlling the electrical power supplied from the battery set to the driving motor, the bicycle driving motor comprising an ultrasonic vibration type motor structure, having an outer casing rotatably mounted on an axle of a wheel of the bicycle, defining therein a first interior space for receiving an inner casing fixed to the wheel axle and defining a second interior space, a thin flat disk like vibration means being disposed inside the second interior space and fixed to the inner casing with a flat piezoelectric means fixed on a first side thereof and a plurality of projections mounted on an opposite second side thereof and angularly equally spaced about the wheel axle, the piezoelectric means being in electrical connection with the battery set via the control device, a thin flat moving means being received within the second interior space and rotatable about the wheel axle, having rubbing material mounted thereon to be corresponding to the projections of the vibration means so that when the electrical power is supplied from the battery set to the piezoelectric means to cause an ultrasonic vibration on the vibration means, the projections of the vibration means are brought into contact with the rubbing material of the moving means, causing the moving means to continue rotating and thus driving the wheel to rotate with a mechanical coupling means.

2. The bicycle driving motor as claimed in claim 1, wherein the mechanical coupling means comprises a planetary gear system having a sun gear rotatable about the wheel axle and drivingly coupled to the moving means, the planetary gear system being drivingly coupled to the outer casing via a a one way clutch, the outer casing comprising apertures to connect to spokes that extend therefrom to a rim of the wheel so that the rotation of the outer casing is transmitted to the wheel via the spokes.

3. The bicycle driving motor as claimed in claim 1, further comprising cushion means disposed between the piezoelectric means and an inside surface of the inner casing.

4. The bicycle driving motor as claimed in claim 1, wherein the moving means comprises a first rotatable member facing the vibration means with the rubbing material fixed thereon and a second rotatable member facing away from the vibration means and disposed next to the first rotatable member with cushion means disposed therebetween.

5. The bicycle driving motor as claimed in claim 1, wherein the wheel axle comprises a central bore in communication with the second interior space for receiving therein an electrical cable having one end connected to the battery set and an opposite end extending into the second interior space through the central bore to be in electrical connection with the piezoelectric means for supplying electrical power thereto.

6. The bicycle driving motor as claimed in claim 1, wherein the outer casing comprises a plurality of blades fixed on an inside surface thereof for generating an air current during the rotation of the outer casing.

7. The bicycle driving motor as claimed in claim 1, further comprising a temperature sensor disposed inside the inner casing to detect inside temperature of the inner casing.

8. The bicycle driving motor as claimed in claim 1, further comprising a speed sensor for detecting rotational speed of the motor.

9. The bicycle driving motor as claimed in claim 8, wherein the speed sensor comprises a reed switch and a mated magnet respectively fixed on the inner casing and the outer casing to correspond to each other.

* * * * *